United States Patent [19]

Riordan et al.

[11] Patent Number: 5,027,270

[45] Date of Patent: Jun. 25, 1991

[54] PROCESSOR CONTROLLED INTERFACE WITH INSTRUCTION STREAMING

[75] Inventors: Thomas J. Riordan, Sunnyvale; Paul S. Ries, San Jose; Edwin L. Hudson, Santa Clara; Earl A. Killian, Palo Alto, all of Calif.

[73] Assignee: Mips Computer Systems, Inc., Sunnyvale, Calif.

[21] Appl. No.: 255,791

[22] Filed: Oct. 11, 1988

[51] Int. Cl.⁵ ...................... G06F 12/12; G06F 13/00
[52] U.S. Cl. ................................ 364/200; 364/243.4; 364/243.41
[58] Field of Search ... 364/200 MS File, 900 MS File

[56] References Cited

U.S. PATENT DOCUMENTS

| | | | |
|---|---|---|---|
| 3,967,247 | 6/1976 | Andersen | 364/200 |
| 4,313,158 | 1/1982 | Porter et al. | 364/200 |
| 4,502,110 | 2/1985 | Saito | 364/200 |
| 4,622,631 | 11/1986 | Frank et al. | 364/200 |
| 4,695,943 | 9/1987 | Keeley et al. | 364/200 |
| 4,847,758 | 7/1989 | Olson et al. | 364/200 |

Primary Examiner—David Y. Eng
Attorney, Agent, or Firm—Townsend and Townsend

[57] ABSTRACT

A processor controlled interface between a processor, instruction cache, and main memory provides for simultaneously refilling the cache with an instruction block from main memory and processing the instructions in the block while they are being written to the cache.

3 Claims, 4 Drawing Sheets

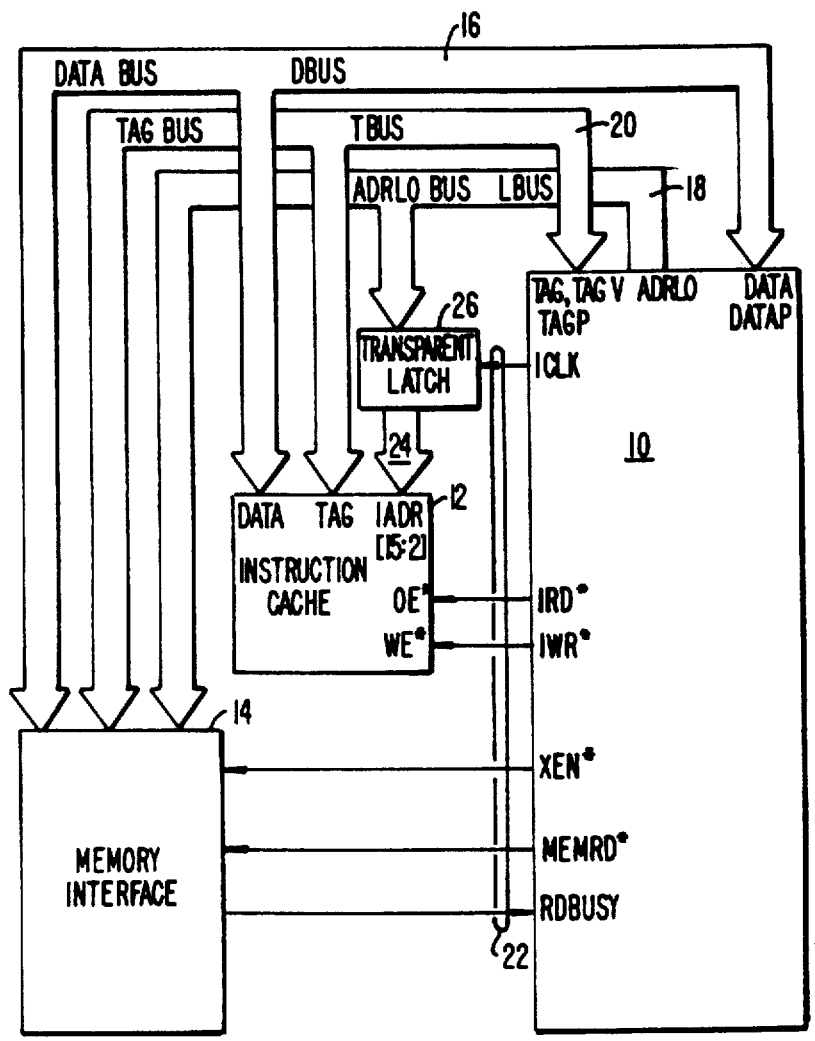
FIG._1.
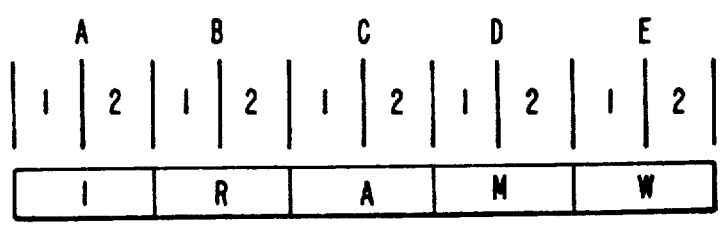
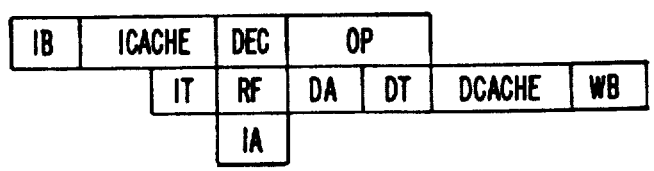
FIG._2.

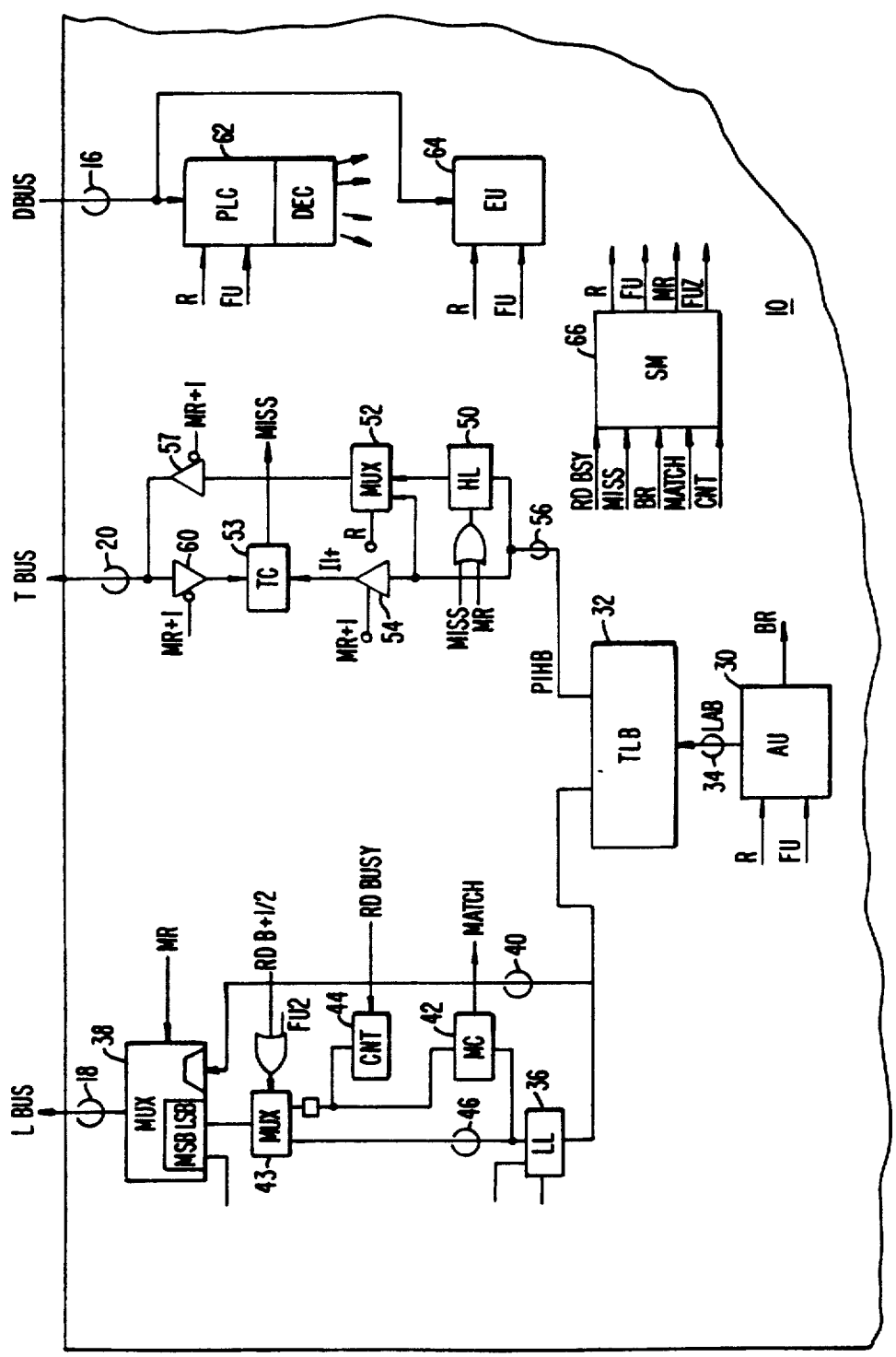
FIG._3.

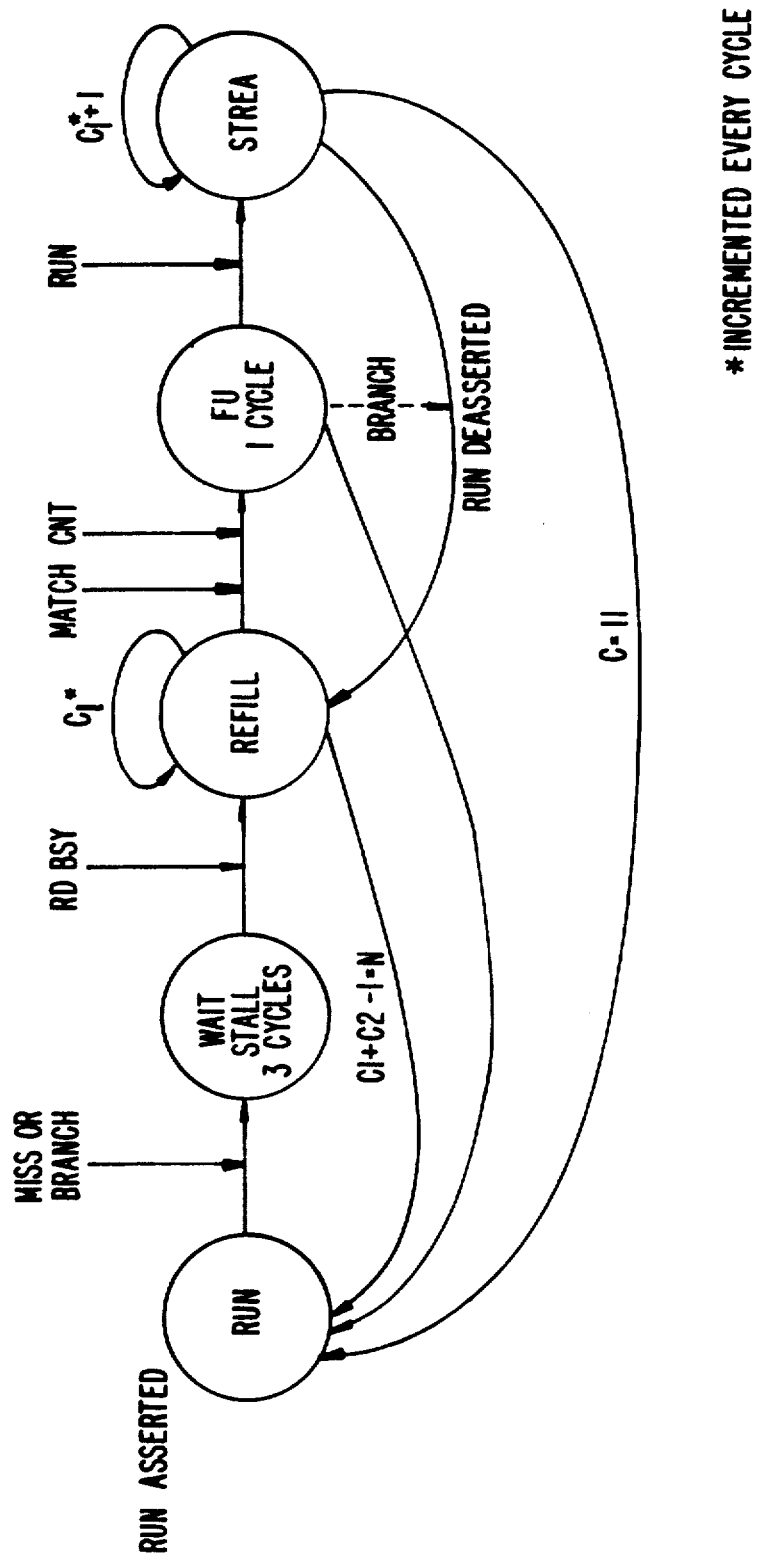
FIG._4.

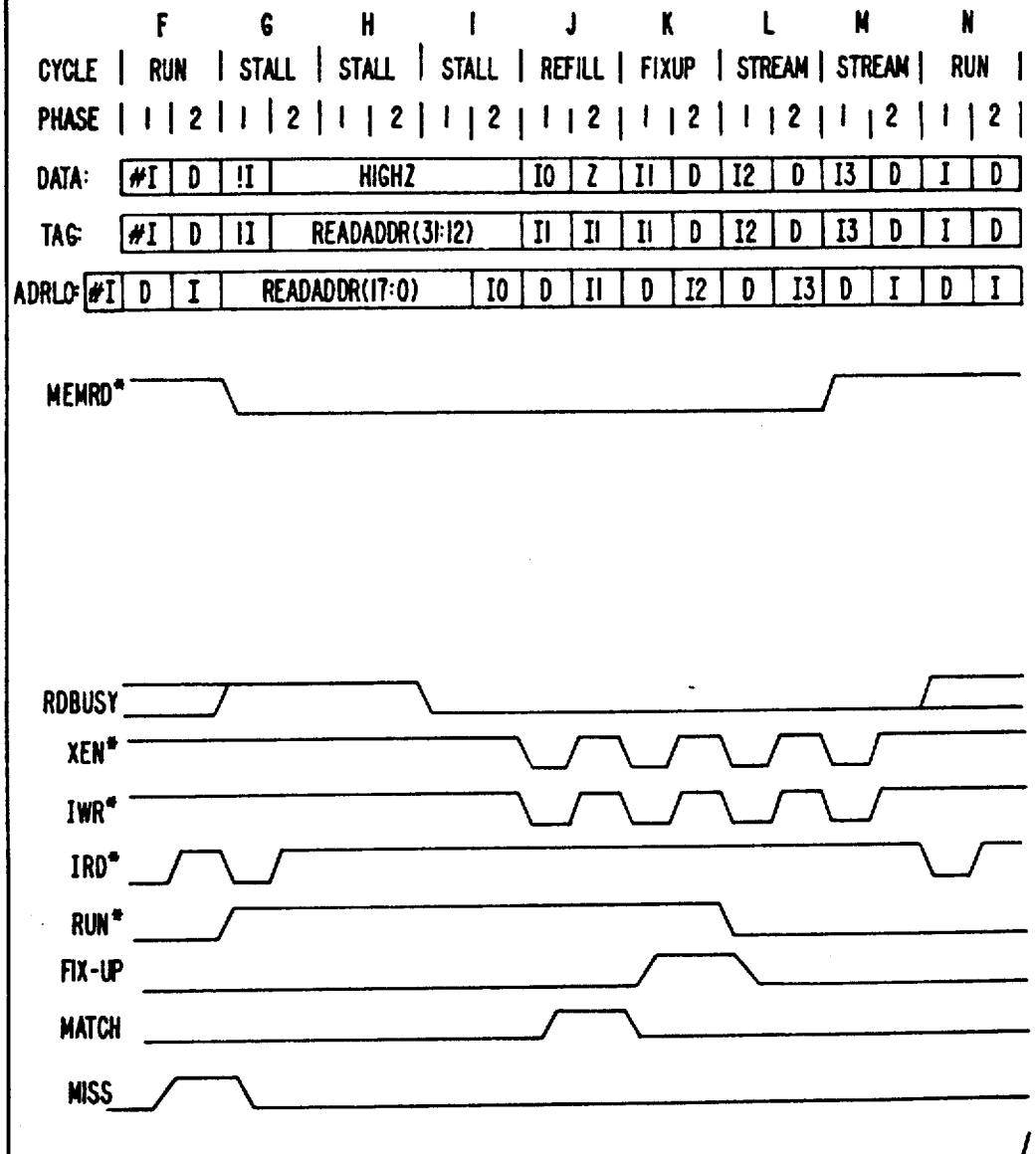
FIG._5.

PROCESSOR CONTROLLED INTERFACE WITH INSTRUCTION STREAMING

BACKGROUND OF THE INVENTION

1. Field of the Invention

The present invention relates generally to digital processors and, more particularly, relates to a processor controlled interface between a processor, instruction cache, and main memory.

2. Description of the Relevant Art

A new development in computer architecture has been the introduction of RISC (Reduced Instruction Set Computer) devices, in which, ideally, an instruction is issued each operational cycle. The key to the efficacy of a RISC machine the ability to execute a very large number of instructions each second. Accordingly, much effort is being expended improving the design of these machines to eliminate any delays to instruction processing.

To maintain a high processing rate, instructions need to be accessed from the instruction store at a rate of one per cycle. Special high-speed memory devices are available from which a single instruction may be accessed in one cycle. However, such devices are expensive and are generally used as an instruction cache to store a portion of the instructions in a given program. The remainder of the instructions are stored in main memory.

If the processor references an instruction not stored in the cache, then a "cache miss" occurs. At this point, the processor must stall while the referenced instruction is written to the cache from main memory during a cache refill operation.

Generally, a single instruction can not be accessed from main memory in one cycle. However main memory may include a page mode feature utilized to access one instruction per cycle after an initial set-up time denoted the "memory latency". This latency occurs each time a cache miss occurs and main memory is newly accessed and is a hardware limitation of the memory system.

Most programs are designed so that instructions are accessed from sequential memory locations except in exceptional circumstance, e.g., the occurrence of a branch in the program. Accordingly, if a given reference misses the cache it is likely that the following reference will also miss the cache. Thus, the cache is often refilled with a block of instructions accessed from main memory including the missed instruction so that the subsequent instructions in the block may be sequentially accessed from the cache. Also, if a block of instructions is accessed, the cache may be refilled at a rate of one instruction per cycle after the initial latency.

Unfortunately, the processor must be stalled during a block refill of the cache with the refill latency. i.e., the length of the stall equal to the sum of the main memory latency and the number of words in a block multiplied by the duration of a cycle. Thus the refill latency caused by the block instruction cache refill operation reduces the number of instructions processed each second.

Accordingly, a system for efficiently refilling the cache while not significantly reducing the processing rate is greatly needed in the field.

SUMMARY OF THE INVENTION

The present invention increases the overall instruction processing rate of a processor utilizing an instruction cache by providing for processing instructions being transferred from main memory to the instruction cache during a cache refill operation.

According to one aspect of the invention, a block refill of the cache and instruction streaming operation is initiated when an instruction reference misses the cache. When, during the cache refill operation, the missed instruction is read from memory it is written to the cache and loaded by the processor during the same cycle. Subsequent instructions in the block are written to the cache and processed during subsequent instruction streaming cycles. An instruction from the cache is accessed during the last cycle of the block refill and instruction streaming operation and is processed during the first cycle following the completion of the block refill.

According to a further aspect of the invention, the processor includes a multistage pipeline, controlled by a pipeline control unit, and an address unit (AU) that generates main memory addresses including high and low address fields. A comparator compares the high address field generated by the AU to a TAG field accessed from the cache. If the two fields do not match then a cache miss occurs, the pipeline is stalled, and the cache is refilled with a block of instructions, including the missed instruction, read from the page in main memory identified by the high address field.

According to a still further aspect of the invention, the low address field is stored and compared to the low address fields of the main memory addresses of the block. When these fields are the same, the instruction read from main memory is loaded into the first stage of the pipeline as it is written to the cache. The remaining instructions in the block are then processed as they are written to the cache.

According to a still further aspect of the invention, streaming is aborted if a predetermined event, such as a branch or data cache miss, occurs and the cache refill operation is subsequently restarted.

Additional features and advantages of the invention will become apparent in view of the drawings and following detailed description.

BRIEF DESCRIPTION OF THE DRAWINGS

FIG. 1 is high level block diagram of a processor controlled interface;

FIG. 2 is a timing diagram depicting a horizontal slice of the pipeline:

FIG. 3 is detailed block diagram of the processor control circuitry in a preferred embodiment:

FIG. 4 is a state diagram; and

FIG. 5 is timing diagram illustrating a cache refill and instruction streaming operation.

DETAILED DESCRIPTION OF THE PREFERRED EMBODIMENTS

Referring now to the drawings, where like reference numerals refer to identical or corresponding parts throughout the several views. FIG. 1 is a high level block diagram of a preferred embodiment of the invention.

In FIG. 1, a processor 10, instruction cache 12, and memory interface 14 are connected to a data bus (DBUS) 16, low address bus (LBUS) 18, tag bus (TBUS) 20, control bus (CBUS) 22, and the IADRBUS 24 by their respective data, address, tag, and control ports. The LBUS 18 and IADRBUS 24 are coupled by a transparent latch 26.

In normal operation, during each cycle, the processor 10 generates a physical main memory instruction address of a given instruction to be processed during the next cycle. Each address includes high and low address fields. The low address field is driven onto the LBUS 18 and defines the address space of the I cache 12, with each LBUS address for accessing one line of the cache 12.

The cache line stored at the memory location in the cache 12 accessed by the address on the LBUS 18 includes a TAG field and a DATA field. The cache is much smaller than main memory and a set of main memory locations are mapped to each cache line. In the present embodiment, all main memory locations having the same low address field are mapped to the cache line accessed by the bits in the low address field. To uniquely identify the word stored in a cache line, the high order bits of the word addresses are stored in the TAG field of the cache line.

When a cache line is accessed by the low address field on the LBUS 18, the TAG field is placed on the TBUS 20 and the data field is placed on the DBUS 16. If the TAG field matches the high address field of the address generated by the processor 10, then the referenced instruction addressed by the main memory address generated by the processor 10 is included in the data field of the line read from the cache. If the TAG field does not match, then the referenced instruction is not stored in the cache and a cache miss occurs.

In the event of a cache miss, the main memory address, including the high and low fields, generated by the processor 10 is transferred to the memory interface 14 via the TBUS 20 and the LBUS 18 and the processor enters a stall mode to halt instruction processing. This transferred address functions as a main memory address that specifies the location of the missed instruction in the main memory.

Once the main memory address is received at the main memory interface 14, a page mode access of a block of instructions, including the missed instruction, is set up. The boundaries of the blocks are predetermined and, in general, the missed instruction will not occupy the first location in the block. After the memory latency period, one instruction in the block is accessed from main memory each cycle and written to the cache 12. The main memory addresses of the block are generated by the memory interface 14 and the high address bits of each instruction address are written into the TAG fields of the cache lines. Thus, the cache 12 is refilled with the block of instructions.

As stated above, usually instructions stored in sequential locations in memory are processed sequentially. According to the present invention, the block of instructions is sequentially transferred from main memory to the DBUS 16 during the cache refill operation. The instructions in the block are written to cache storage locations addressed by the lower bits of the main memory address on the LBUS 18. As described above, the missed instruction will not often occupy the first location in the block. The processor 10 enters a REFILL state while instructions prior to the given instruction are written to the cache 12.

When the missed instruction is transferred to the DBUS 16 from main memory during a given cycle, the processor 10 enters a FIXUP state and loads the instruction during the given cycle to prepare for resuming processing during the next cycle. The processor then enters the instruction STREAM state where instructions are processed while being written to the cache 12.

Subsequently, an instruction is read from main memory, written to the cache 12, and processed by the processor 10 during each successive cycle until all the instructions in the block have been accessed from main memory. The last instruction in the block is accessed during a final STREAM cycle.

Additionally, during the final streaming cycle the processor generates the address of the instruction to be processed during the next cycle. This instruction is accessed from the cache unless another cache miss occurs.

Thus, the present system reduces the duration of the refill latency due to a processor stall required in the event of a cache miss followed by a block cache refill operation.

The following terminology will be utilized to more fully describe the operation of the system. A cycle is the basic instruction processing unit for the processor 10 and all cycles are classified as either run or stall cycles. Processor transactions which occur during the first half of a cycle are called phase 1 transactions while those which occur during the second half are called phase 2 transactions. Whether or not a data transfer occurs, each run cycle is considered as having an instruction-data (ID) pair associated with it.

In run cycles, forward progress is made and an instruction is retired from the pipeline 30. In addition to regular run cycles, where instructions out of the cache 12 are processed, refill run (streaming) cycles occur when instructions out of main memory are processed.

There are three types of stall cycles: wait, refill, and fixup. No cache activity occurs during wait cycles. Refill cycles occur during main memory reads and are used to refill the cache 12. Fixup cycles occur during the final cycle of a stall, just before the next run cycle, and are used to restart the pipeline 30.

The processing of an instruction during the run mode of the processor and associated bus transactions will be described with reference to FIG. 2. The pipeline is five stages deep and is partitioned as follows: instruction fetch, register fetch, ALU, memory access, and writeback. FIG. 2 depicts a horizontal slice of the pipeline showing the execution of one instruction over five cycles (A-E).

During cycle A1 the address of the present instruction is translated to a physical address and transferred to the LBUS 18 during cycle A2. The line accessed from the cache 12 is transferred to the DBUS 17 and the TBUS 20 during cycle B1. Additionally, during cycle B1 a full translation of the instructions virtual address is performed and the TAG field is compared to the high order bits of the instruction address to determine whether the reference missed the cache 12.

During cycle B2 the instruction is decoded and the address of the next instruction to be fetched is calculated. At this point it is known whether the program will branch to a non-sequential address. The remainder of the pipeline processing is standard and not relevant to the invention.

FIG. 3 is a block diagram of the processor circuitry required to implement instruction streaming. The various digital elements depicted are standard functional units and their internal circuitry is not relevant to the invention.

In FIG. 3, an address unit (AU) 30 is coupled to a translation look aside buffer (TLB) 32 by an internal low address bus 34. The low address bits of the physical address generated by the TLB 32 are transferred to an low latch (LL)36 and the second input of an LBUS mux 38 by a physical address internal low bus (PLIB) 40. The two LSBs of the LL 40 are coupled to the first input port of a match comparator 42 and the first input of MUX 43. The output of a counter 44 is coupled to the second input port of the MC 42 and to the first input port of MUX 43 by a half-cycle delay element. The output of MUX 43 is coupled to the LSB inputs of the first input port of MUX 38. The MSBs of the LL 40 are coupled to the MSB inputs of the first input port of the LBUS mux 38 by bus 48. The output port of the LBUS mux 38 is coupled to the LBUS 18.

The circuitry for driving data cache addresses onto the LBUS during phase 2 transactions is not depicted.

The high address bits of the physical address generated by the TLB 32 are transferred to a high latch (HL) 50, the first input of a TBUS mux 52, and the first input of a tag comparator (TC) 53, via a first out driver 54, by a physical address internal high bus (PIHB) 56. The output of the HL 50 is coupled to the second input of the TBUS mux 52. The output of the TBUS mux 52 is coupled to the TBUS 20 by a second out driver 57 and the second input of the TC 53 is coupled to the TBUS 20 by a first in driver 60.

The DBUS is coupled to the inputs of a pipeline control unit (PCU) and instruction decoder 62 and to an execution unit (EU) 64.

A state machine 66 receives the Miss signal issued by the TC 53, the Match signal issued by the MC 42, the CNT signal generated by the CNT 44, and the RdBusy signal issued by the memory interface 14. Additional, the state machine 66 issues the Run* signal (R) received at the control ports of the AU 30, MUX 52, PLC 62, and EU 64 the fixup signal (FU) received by the PLC 62 and EU 64; and, the MemoryRd* (MR) signal received by the MUX 38. LL 36, drivers 52. 54 and 60 (MemRd delayed by one cycle), and HL 50. The state machine 66 also generates a Fixup2 signal.

The RdBusy signal is received at the control port of CNT 44, the signal Miss OR MemRd is received at the control ports of LL and HL 36 and 50, and the signal RdBusy(delayed by a half-cycle OR Fixup2) is received at the control port of MUX 43.

FIG. 4 is a state diagram for the state machine 66. In FIG. 4, the vertical lines indicate signals that cause state transitions. For some states the transitions occur automatically after the passage of a designated number of cycles.

FIG. 5 is a timing diagram illustrating the operation of the system for a cache refill and instruction streaming operation. In addition to illustrating the states of the signals defined above, the states of an XEn* signal (the main memory read enable signal). and IWr* and IRd* signal (the cache write and read enable signals) are also depicted. The following symbols are used in FIG. 5: I for an instruction. D for data. #I for an incorrect instruction, and !I for an unused instruction.

Referring now to FIGS. 1-5, assume that in the half cycle preceding cycle F the address of the next instruction (the read address)to be fetched is calculated in the AU 30, translated by the TLB 32, and transferred to the LBUS 18.

In this case a cache miss occurs and, during cycle F1, the instruction #I is fetched from the cache 12 and transferred to the DBUS 16 while the TAG field for #I is fetched and transferred to the TBUS 20. The TAG field and high address bits of the instruction are compared at TC 53 and do not match, thus the Miss signal is asserted by TC 53 and causes the read address of the missed instruction to be latched into HL and LL 50 and 36.

During cycle F2, the address of the next instruction, !I, is calculated and transferred to the LBUS 18.

In cycle G1 the state machine enters the STALL state in response to the Miss signal. Accordingly, Run* is deasserted and MemRd* is asserted. Additionally, the memory interface 14 asserts RdBusy to maintain a stall during the memory latency period. The assertion of MemRd* causes MUX 38 to couple its first input to the LBUS 18 thereby transmitting the latched MSB low bits of the read address to the LBUS. Also, because RdBusy is asserted MUXes 38 and 43 couple the latched LSB low bits of the read address to the LBUS. Also, the instruction !I, fetched from the cache, is resident on the DBUS 16 and TBUS 20. Additionally, the deassertion of Run* causes MUX 52 to couple the output of HL 50 to the input of the second out driver 51.

In cycle G2 the DBUS 16 is tristated and the second out driver 57, in response to the delayed assertion of the MemRd* signal, couples the output of HL 50 to the TBUS 20. Accordingly, the high and low bits of the read address are transmitted to the Memory interface 14 which sets up a page mode access of an instruction block from main memory.

During cycles H1 to I1 the stall is maintained due to memory latency. During cycle I1. RdBusy is deasserted and the counter is started. The counter will generate the two LSBs of the low addresses of the block to be accessed over the next four cycles.

During cycle I2, the MUX 39, in response to the deassertion of RdBusy, delayed by half a cycle, transfers the CNT output (00) to the LSB lines of the LBUS 18. This is the address of IO, the first instruction in the block being accessed from the memory. The latched high order read address bits from HL 50 are transmitted on the TBUS to provide the full main memory address of IO.

As stated above, the missed instruction does not necessarily correspond to the first instruction in the block (IO). As the CNT 44 generates the LSBs of the words in the block these LSBs are compared to the LSBs of the read address latched in LL 36 at MC 42. When these bits match, the MC 42 asserts the Match signal. In the present example, it is assumed that the cache miss occurred for the second address, I1, of the block.

During cycle J1 the CNT 44 generates the LSBs of the address for I1, accordingly, the bits at both inputs of MC 42 match and the Match signal is asserted.

During cycle J2 the low address for I1 is on the LBUS 18.

During cycle K1, the state machine 66 enters the FIXUP state in response to the Match signal. The Fixup signal is asserted to cause the PLC 62 to transfer I1 into the pipeline.

During cycle K2, the AU 30, in response to Fixup signal calculates the address of the next instruction following I1. The counter generates the LSBs to access the third instruction in the block, I3.

In cycle L1, the state machine 66 enters the STREAM state in response to the assertion of the Match signal. The Run* signal is reasserted to start the pipeline and begin processing the instructions as they are fetched from main memory. The Run* signal causes MUX 52 to couple the PIHB 56 to the TBUS. Thus, the high address bits for I2 are transferred to the TBUS from the TLB and are written into the TAG field of the cache line addresses by the bits on the LBUS 18. Additionally the CNT has finished counting out the instructions in the block.

In cycle M1 the MemRd* signal is deasserted in response to the CNT 44 counting out the last address in the block. The last instruction in the block, I3, is on the DBUS 16 and the latched high order address bits of I3 are driven on the data bus.

During cycle M2, I3 is decoded and the address for the next instruction. I. is calculated at the AU 30. The deassertion of MemRd* causes MUX 38 to couple the low address bits of this calculated address to the LBUS 18.

During cycle N1, the RUN state is entered after a delay of one cycle from the deassertion of MemRd*. The drivers 54, 57, and 60 cause the comparison of the TAG field and high address bits of the generated address to recommence. Operation then continues as described above with reference to FIG. 2.

In operation, there is a high probability of processing a branch instruction during streaming. If I1 were a branch instruction, then the next instruction in the block, I2, would not be the next instruction to be executed. However, it is required that the cache 12 be refilled with the entire block of instructions.

In this case, during cycle K1, the AU 30 calculates the address of the next instruction specified by I1, determines that a branch has occurred, and issues the branch signal. The branch signal causes the state machine 66 to reenter the REFILL state and deassert the Run* signal to halt the PLC 62. EU 64, and cause MUX 52 to recouple the latched high read address bits in HL 50 onto the TBUS 20.

Refill then continues during cycles L and M and, during L2 the counter counts out and causes a transition from the REFILL state to the FIXUP state and the generation of the Fixup2 signal. Thus. MUX 43 couples the latched low address bits in LL 36 to the LBUS so that the low address for I1 is driven onto the LBUS during cycle M2, the instruction would be fetched onto the data bus during N1, and the address for the next instruction would be instruction would be calculated during N2. The RUN state would then be entered during the next cycle.

Thus, the system will remain in the STREAM state so long as a stream break event, such as a branch does not occur. However, if a stream break does occur, the REFILL of the cache 12 is completed.

When streaming begins as the result of an arbitrary branch, the target address is uniformly distributed throughout the block. However, if a cache miss occurs as the result of executing through a block stored in the cache 12 then the target address will be the first address in the block. In practice, the miss address is the first address in the block 70% of the time. Thus, the refill latency is reduce.

The invention has now been described with reference to preferred embodiments. Variations and substitutions will now be apparent to persons of skill in the art. In particular, a direct mapped instruction cache is utilized in the above described embodiments. However, the principles of the invention are applicable to an associatively mapped cache utilizing a cache refill algorithm. Further, the particular timing and control signals may be varied according to the particular processing environment utilized. Accordingly, the invention is not intended to be limited except as provided by the appended claims.

What is claimed is:

1. In a processor supported interface to cache and main memory, with the processor having a multi-stage pipeline for simultaneously executing one pipeline stage for each instruction in the pipeline and with a cycle being the basic instruction processing unit for the processor, an improved method for performing a main memory read and cache refill operation in the event that an instruction reference misses the cache, said method comprising the steps of:

initiating a pipeline stall during the first cycle subsequent to the cache miss to halt processing of instructions in the pipeline;

initiating a main memory block read operation;

reading a block containing a plurality of instructions from said main memory, with said block including said referenced instruction, where the reading step is delayed from the initiating step by a memory latency time interval, where the instructions in said block are sequentially read during successive main memory access cycles staring at a first and ending at a last main memory cycle, and where the referenced instruction is read from main memory during a given main memory access cycle;

refilling the cache by writing each instruction in the block to the cache during the main memory access cycle in which the instruction is read from main memory;

initiating a fix-up operation during said given main memory cycle to load the referenced instruction into the pipeline;

terminating the pipeline stall during the main memory access cycle following the given main memory access cycle to restart the pipeline and to restart processing of the instructions in the block that follow the referenced instruction as they are read from main memory during main memory access cycles;

loading, during a single cycle, at least one particular instruction, included in said block and which follows said referenced instruction, in said cache, and concurrently loading said particular instruction into the pipeline during said single cycle;

referencing a first instruction not included in said block of instructions during the last main memory access cycle in which the last instruction of said block is read; and processing said first non-block instruction during the cycle following said last main memory access cycle.

2. In a CPU including a processor, an instruction cache, and a memory interface, a method for reducing the latency due to a cache refill operation required in the event of a branch to an arbitrary address that misses the cache, said method comprising the steps of:

initiating a block refill operation of the cache by reading a plurality of sequential instructions from memory;

generating the sequential refill addresses of the block to read the block from memory;

comparing said generated refill addresses with said arbitrary address and issuing a match signal when said addresses are the same;

responding to said match signal to initiate concurrent loading of instructions into the pipeline and refilling of the instructions following the issue of the match signal; and loading, during a single cycle, at least one particular instruction, included in said block, into said cache, and concurrently loading said particular instruction into the pipeline during said single cycle.

3. In a CPU including a processor, an instruction cache, and a memory interface, a system for reducing the latency due to a cache refill operation required in the event of a branch to an arbitrary address that misses the cache, said system comprising the steps of:

means for initiating a block refill operation of the cache by reading a plurality of sequential instructions from memory;

means for generating the sequential refill addresses of the block to read the block from memory;

means, coupled to said means for generating the sequential refill addresses, for comparing said generated refill addresses with said arbitrary address and issuing a match signal when said addresses are the same;

means, coupled to said means for comparing and responsive to said match signal, for initiating concurrent loading of the instructions into the pipeline and refilling of the instructions following the issue of the match signal;

means, coupled to said means for initiating, for loading during a single cycle at least one particular instruction included in said block into said cache, and for concurrently loading said particular instruction into the pipeline during said single cycle;

means for monitoring for a processor requested instruction address that prevents the sequential loading of the instructions in the block, thereby indicating the occurrence of a break condition; and means, coupled to said means for monitoring, for discontinuing concurrent loading of the instructions in the block and for continuing the block refill operation when a break condition occurs.

* * * * *